United States Patent
Champion et al.

(10) Patent No.: US 7,147,948 B2
(45) Date of Patent: Dec. 12, 2006

(54) METHOD AND APPARATUS FOR ENHANCING CATALYTIC ACTIVITY

(75) Inventors: David Champion, Lebanon, OR (US); Christopher Beatty, Albany, OR (US); Peter Mardilovich, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 569 days.

(21) Appl. No.: 10/428,297

(22) Filed: Apr. 30, 2003

(65) Prior Publication Data

US 2004/0219403 A1    Nov. 4, 2004

(51) Int. Cl.
  *H01M 8/04* (2006.01)
  *H01M 8/00* (2006.01)
  *H01M 8/12* (2006.01)
  *H01M 2/14* (2006.01)

(52) U.S. Cl. .................. 429/17; 429/13; 429/19; 429/23; 429/25; 429/38; 429/39

(58) Field of Classification Search .............. None
  See application file for complete search history.

(56) References Cited

U.S. PATENT DOCUMENTS

| | | | |
|---|---|---|---|
| 4,910,100 A | | 3/1990 | Nakanishi et al. |
| 5,149,601 A | | 9/1992 | Shiratori et al. |
| 5,549,983 A | | 8/1996 | Yamanis |
| 5,851,689 A | * | 12/1998 | Chen ............................ 429/13 |
| 5,922,485 A | * | 7/1999 | Enami .......................... 429/26 |
| 6,274,258 B1 | | 8/2001 | Chen |
| 6,280,869 B1 | | 8/2001 | Chen |
| 6,291,089 B1 | * | 9/2001 | Piascik et al. ................ 429/17 |
| 6,551,736 B1 | * | 4/2003 | Gurau et al. .................. 429/39 |
| 2004/0081871 A1 | * | 4/2004 | Kearl et al. ................... 429/26 |

* cited by examiner

*Primary Examiner*—Patrick Joseph Ryan
*Assistant Examiner*—Karie O'Neill (57) ABSTRACT

A fuel cell has at least one electrode operatively disposed in the fuel cell, the electrode(s) having a catalytically active surface. A mechanism is provided for substantially maintaining catalysis over the active surface of the electrode(s).

50 Claims, 3 Drawing Sheets

METHOD AND APPARATUS FOR ENHANCING CATALYTIC ACTIVITY

BACKGROUND OF THE INVENTION

The present invention relates generally to fuel cells, and more particularly to fuel cells substantially maintaining catalysis over the active electrode surface.

Fuel cells use an electrochemical energy conversion of a fuel and oxidant into electricity and heat. It is anticipated that fuel cells may be able to replace generators, primary and secondary batteries, etc. as a portable and/or non-portable power supply. In fuel cells, the fuel (containing a source of hydrogen or other oxidizable compound) is oxidized with a source of oxygen to produce (primarily) water and carbon dioxide. The oxidation reaction at the anode, which liberates electrons, in combination with the reduction reaction at the cathode, which consumes electrons, results in a useful electrical voltage and current through the load.

As such, fuel cells provide a direct current (DC) voltage that may be used to power motors, lights, electrical appliances, etc. A solid oxide fuel cell (SOFC) is one type of fuel cell that may be useful in portable applications, as well as in many other applications.

Improved thermal characteristics and performance are generally at the forefront of new fuel cell designs.

SUMMARY OF THE INVENTION

The present invention solves the drawbacks enumerated above by providing a fuel cell having at least one electrode operatively disposed in the fuel cell, and having a catalytically active surface. A mechanism is provided for substantially maintaining catalysis over the active surface of the electrode(s).

BRIEF DESCRIPTION OF THE DRAWINGS

Objects, features and advantages of the present invention will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION OF THE EMBODIMENTS

As will be described further hereinbelow, in an embodiment(s) of the fuel cell system of the present invention, fuel cell architecture incorporating inwardly directed radial fuel flow integrated with centrally located exhaust combustion generally advantageously results in improved thermal management and enhanced fuel flow through the fuel cell system.

Figure 1:
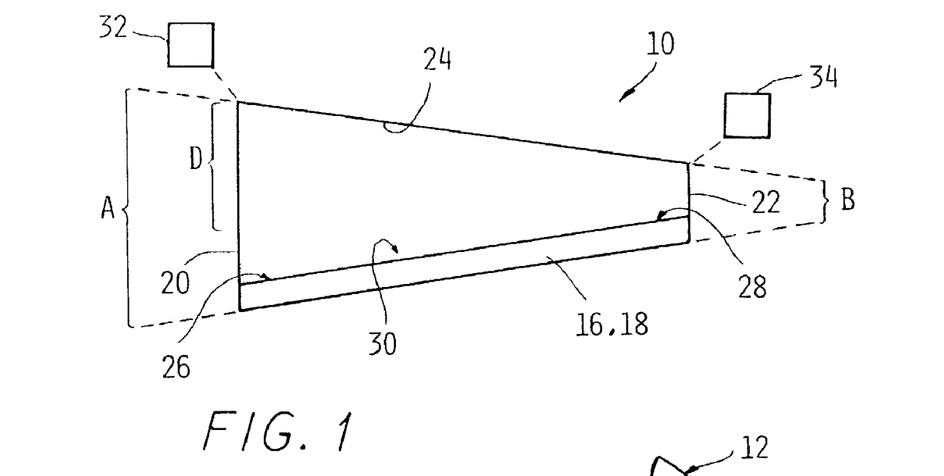
FIG. 1 is a block diagram schematically showing an embodiment of the present invention.

Referring now to FIG. 1, an embodiment of the fuel cell system of the present invention is designated generally as 10. Fuel cell system 10 includes a flow passage 24 having an inlet 20 and an outlet 22 for a gas stream. In an embodiment of the present invention, the inlet 20 has an area A larger than the area B of the outlet 22. The gas stream at the inlet 20 has a predetermined pressure higher than atmospheric pressure. However, it is to be understood that, in certain instances in alternate embodiments, the pressure of the gas stream at the inlet 20 is not higher than atmospheric pressure.

At least one electrode 16, 18 has a catalytically active surface 30 and is disposed in flow passage 24. The active surface 30 has an inlet end region 26 and an outlet end region 28. Without being bound to any theory, it is believed that the differential D between the inlet area A and the outlet area B results in the gas stream increasing velocity as it moves over the inlet end region 26 toward the outlet end region 28, thereby substantially maintaining catalysis on the active surface 30.

In an embodiment of the present invention, pressure at the outlet end region 28 is substantially at or higher than atmospheric pressure. It is to be understood that the pressure at outlet end region 28 may also be substantially at or lower than atmospheric pressure.

In an embodiment of the fuel cell system 10 of the present invention, heat generated by the fuel cell system 10 is substantially concentrated adjacent outlet 22 (i.e. the thermal energy moves radially inwardly). In contrast, thermal energy in known fuel cells generally tends to vector outwardly. This radial inward flow of thermal energy according to embodiments of the present invention further enables small SOFC systems by moving hot gases to the center of the system (convection moves inward while conduction and radiative moves radially outward). Still further, this feature generally reduces the temperature of the outer shell and correspondingly allows the use of lower-cost material(s).

In a further embodiment of the present invention, the fuel cell system 10 further includes a compressor 32, operatively and fluidly connected to the flow passage inlet 20, for supplying the gas stream at a predetermined pressure, as desired and/or necessitated by a particular end use.

Still further, an embodiment of the fuel cell system 10 of the present invention may include a catalytic combustor 34, operatively and fluidly connected to the outlet 22, for oxidizing reaction products of catalysis. Both the compressor 32 and catalytic combustor 34 are shown schematically in the block diagram of FIG. 1. Without being bound to any theory, it is believed that some non-limitative purposes of the catalytic combustor 34 include the following. First, it 34 may optionally be used during the start-up of the fuel cell system 10 to generate heat and warm the fuel cell system 10. This may be accomplished by reversing fuel flow such that it enters exhaust conduit 38 (in a flow pattern opposite that shown, for example, by arrows E in FIG. 3) and enters catalytic combustor 34 at start-up for a period of time sufficient to pre-heat the fuel cell system 10 to a desired predetermined temperature/temperature range, e.g. operational temperature. Once the fuel cell system 10 reaches the desired temperature, the fuel flow is then returned to the flow pattern as described herein (for example, as shown by arrows F in FIG. 3). Second, catalytic combustor 34 combusts unutilized fuel to avoid its release into the environment. Some non-limitative benefits gleaned from including the combustor 34 in the fuel cell system 10 are minimization of system volume; intimate thermal contact during startup; aid in concentrating thermal energy to the center of the system 10; and facilitating use of low cost materials external to the fuel cell system 10.

In the fuel cell system 10 of embodiments of the present invention, the gas stream is at least one of reactants, oxidants, and/or mixtures thereof. In an embodiment, the reactants are fuels, and the oxidants are one of oxygen, air, and mixtures thereof. It is to be understood that any suitable fuel/reactant may be used with the fuel cell system 10 of the present invention. In an embodiment, the fuel/reactant is selected from at least one of hydrogen, methane, ethane, propane, butane, pentane, methanol, ethanol, higher straight chain or mixed hydrocarbons, for example, natural gas or gasoline (low sulfur hydrocarbons may be desirable, e.g. low sulfur gasoline, low sulfur kerosene, low sulfur diesel), and mixtures thereof. In an alternate embodiment, the fuel/reactant is selected from the group consisting of butane, propane, methane, pentane, and mixtures thereof. Suitable fuels may be chosen for their suitability for internal direct reformation, suitable vapor pressure within the operating temperature range of interest, and like parameters.

Figure 2:
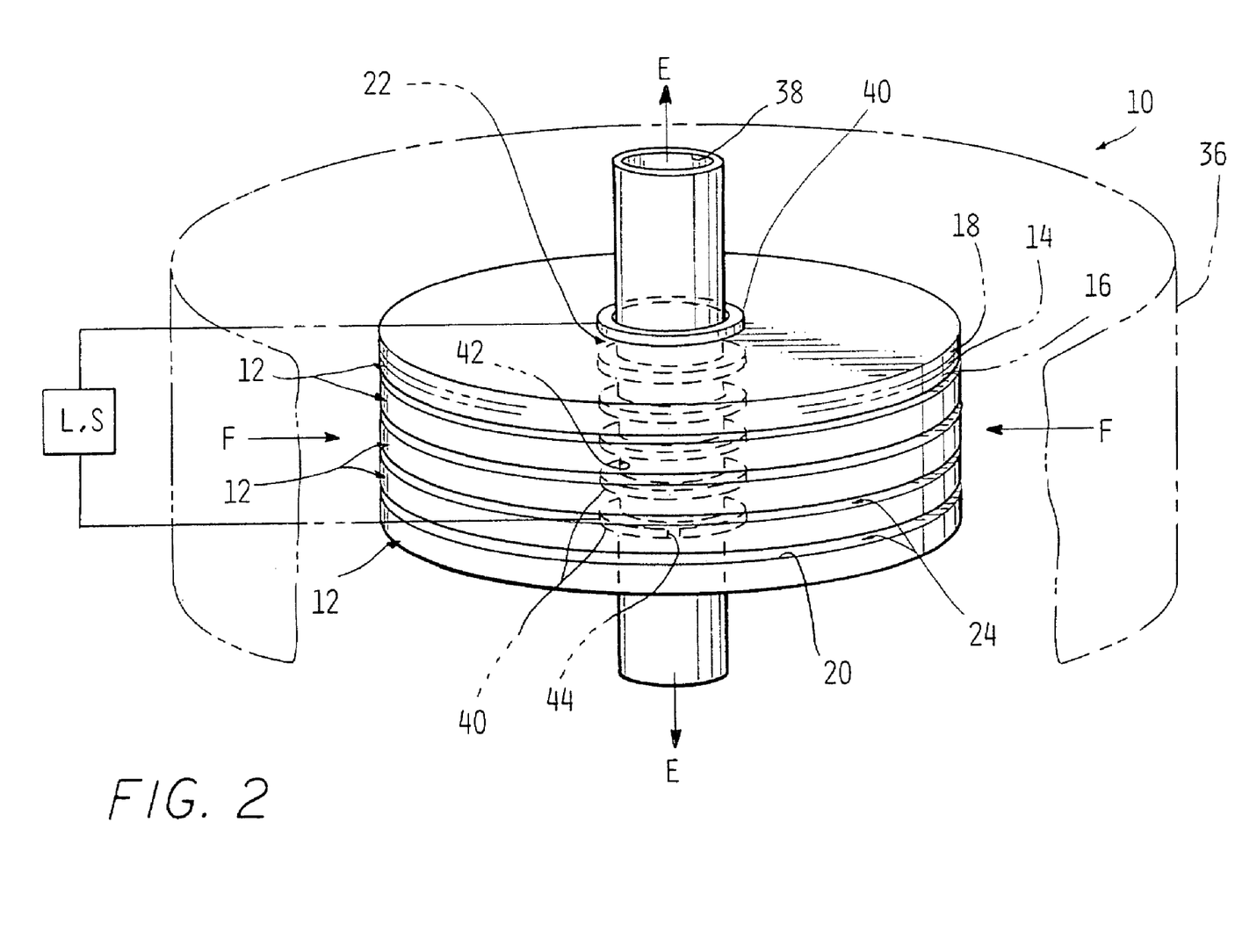
FIG. 2 is a perspective front view of an embodiment of the present invention showing several fuel cell assemblies and showing the gas diffusing manifold wall partially cut away and in phantom.

Referring now to FIG. 2, fuel cell system 10 of an embodiment of the present invention may further include a manifold 36 operatively and fluidly connected to the inlet 20 for adding the gas stream to the flow passage 24. Manifold 36 may define a housing containing fuel cell system 10.

Figures 2A, 4:
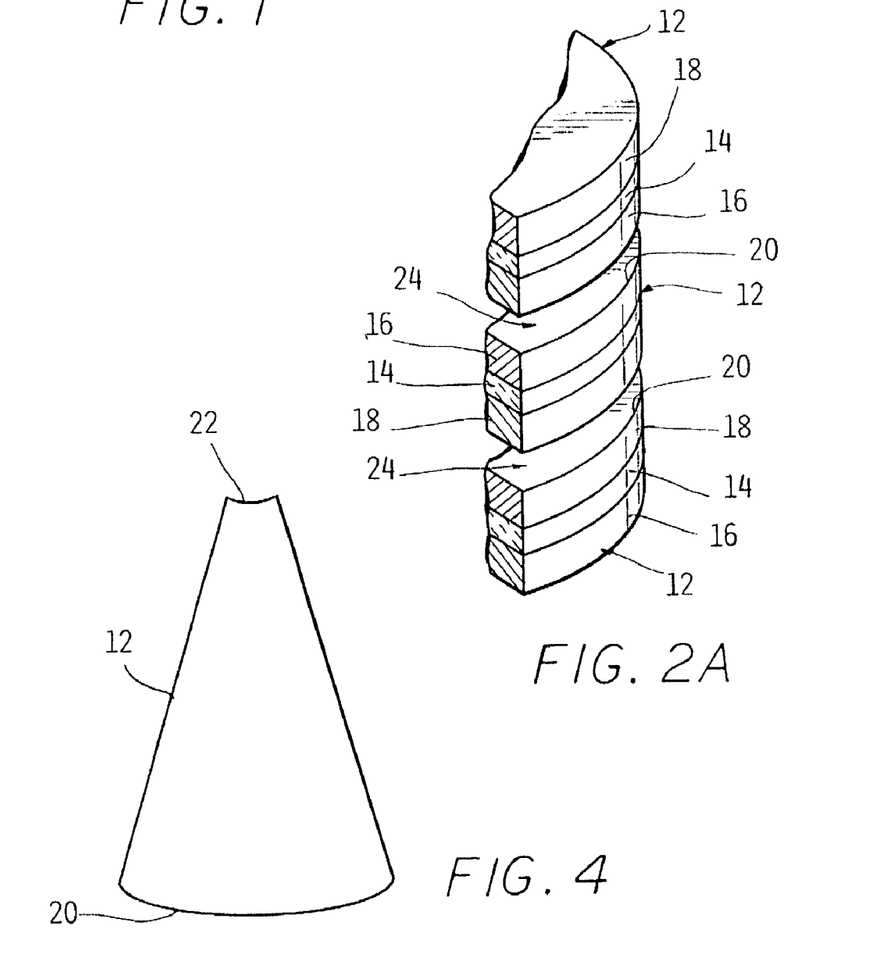
FIG. 2A is an enlarged cutaway cross-sectional perspective view of a portion of three of the fuel cell assemblies shown in FIG. 2.
FIG. 4 is a block diagram of an embodiment of the present invention.

Referring now to FIG. 2A, fuel cell system 10 includes at least one fuel cell assembly 12, which includes an electrolyte 14, and a counter-electrode 18, 16 disposed on one side of electrolyte 14. The electrode 16, 18 is disposed on the same or the opposite side of electrolyte 14. It is to be understood that the electrode 16, 18 may be either an anode 16 or a cathode 18, and the counter-electrode 18, 16 is the other of the cathode 18 and anode 16.

Referring back to FIG. 2, fuel cell system 10 of the present invention may further comprise an exhaust conduit 38 in fluid communication with outlet(s) 22. Fuel cell system 10 further includes an electrical interconnect member 40 between the fuel cell system 10 and an electrical load L and/or an electrical storage device S. An electronic device according to the present invention includes the electrical load L, and fuel cell system 10 connected to the load L.

An embodiment of a method of using fuel cell system 10 includes the step of operatively connecting the fuel cell system 10 to electrical load L and/or to electrical storage device S. The electrical load L may include many devices, including, but not limited to any or all of computers, portable electronic appliances (e.g. portable digital assistants (PDAs), portable power tools, etc.), and communication devices, portable or otherwise, both consumer and military. The electrical storage device S may include, as non-limitative examples, any or all of capacitors, batteries, and power conditioning devices. Some exemplary power conditioning devices include uninterruptible power supplies, DC/AC converters, DC voltage converters, voltage regulators, current limiters, etc.

It is also contemplated that the fuel cell system 10 of the present invention may, in some instances, be suitable for use in the transportation industry, e.g. to power automobiles, and in the utilities industry, e.g. within power plants.

In an embodiment, fuel cell system 10 includes a plurality of the fuel cell assemblies 12 and a plurality of the interconnect members 40, wherein at least one of the plurality of interconnect members 40 is associated with each of the plurality of fuel cell assemblies 12. As can be seen in FIG. 2, five fuel cell assemblies have been shown for illustrative purposes and six interconnect members 40. It is to be understood that any number of fuel cell assemblies 12 may be used as desired and/or necessitated by a particular end use. Further, an embodiment of fuel cell system 10 of the present invention may further comprise a plurality of flow passages 24, wherein at least some of the plurality of interconnect members 40 space adjacent fuel cell assemblies 12 from each other, thereby forming one of the plurality of flow passages 24 therebetween (as seen in FIGS. 2 and 2A).

Referring again to FIG. 2, each of the plurality of fuel cell assemblies 12 is substantially cylindrically shaped with a hollow center region 42. In an embodiment of fuel cell system 10, exhaust conduit 38 is operatively disposed in the plurality of hollow center regions 42 and in fluid communication with the outlet 22 of each of the plurality of flow passages 24.

It is to be understood that the interconnect members 40 may be of any suitable size, shape, and formed of any suitable material as desired and/or necessitated by a particular end use. However, in an embodiment of fuel cell system 10, each of the plurality of interconnect/current collector members 40 is substantially ring shaped and is porous, partially porous, and/or slotted (an example of a slot in interconnect member 40 is designated as 44). In an embodiment of the present invention, interconnect members 40 have as a main component thereof an electrically conductive material. Some suitable examples of such an electrically conductive material include, but are not limited to at least one of silver, palladium, platinum, gold, gold plated ceramics, titanium, tantalum, chromium, stainless steel, iron, nickel, carbon, lanthanum-strontium-chromate, and mixtures thereof. Without being bound to any theory, it is believed that gold, platinum and $La_{0.5}Sr_{0.5}CrO_4$ may be better suited for use on the cathode 18 side of the fuel cell assembly 12.

In an embodiment of the fuel cell system 10 of the present invention, the gas flows radially inward in the direction of arrows F from an outer circumference of at least one of the plurality of fuel cell assemblies 12 toward the exhaust conduit 38. The exhaust gases exit the exhaust conduit 38 in an axial direction, as shown by arrows E.

It is to be understood that the hollow center regions 42 may be of any suitable size and shape as desired. In an embodiment of the present invention, each of the plurality of hollow center regions 42 is substantially circular. Further, it is to be understood that the exhaust conduit 38 may be of any suitable size and shape, as desired and/or necessitated by a particular end use. In an embodiment of the present invention, exhaust conduit 38 is substantially cylindrical, as shown in FIG. 2. It is to be further understood that exhaust conduit 38 may be formed from any suitable high temperature material having a thermal coefficient of expansion well matched with the surrounding materials.

In an embodiment, conduit 38 is formed from a material that is at least one of porous, non-porous and partially porous. (In FIG. 3, porous sections of conduit 38 are shown stippled.) Some suitable examples of such a material include, but are not limited to at least one of alumina, anodic alumina, zirconia, yttria-stabilized zirconia, samarium doped-ceria, gadolinium doped-ceria, $La_aSr_bGa_cMg_dO_{3-\delta}$, (LSGM) and mixtures thereof. One example of a suitable LSGM compound is $La_{0.8}Sr_{0.2}Ga_{0.83}Mg_{0.17}O_{2.815}$.

Referring now to FIG. 2A, anodes 16 from adjacent fuel cell assemblies 12 face each other, and cathodes 18 from adjacent fuel cell assemblies 12 face each other. It is to be understood that alternately, the anode 16 from each of the plurality of fuel cell assemblies 12 may face the cathode 18 of an adjacent fuel cell assembly 12 (as shown in FIG. 3).

Figure 6:
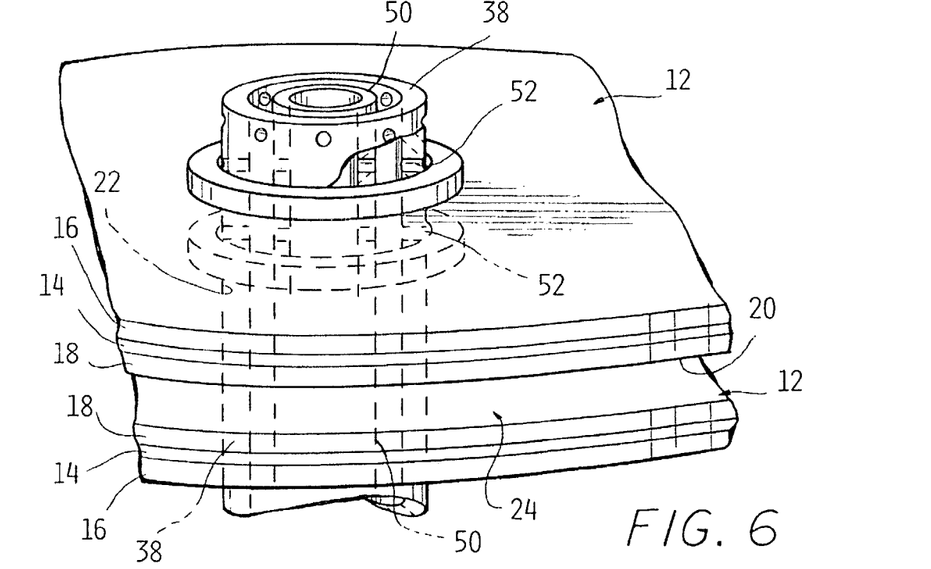
FIG. 6 is an enlarged, cutaway perspective view of an alternate embodiment of the oxidant inlet.

In an embodiment of the present invention, the fuel cell system 10 is a dual chamber fuel cell (FIGS. 2, 2A and 6). In embodiments of dual chamber fuel cells, the gas is one of reactants and oxidants. Oxidants are carried to the cathode 18 of each of the fuel cell assemblies 12, and reactants are carried to the anode 16 of each of the fuel cell assemblies. Although the embodiments shown in FIGS. 2, 2A and 6 are designated as dual chamber fuel cells, it is to be understood that these embodiments alternately may be single chamber fuel cells. In embodiments of single chamber fuel cells, the gas is a mixture of reactants and oxidants.

Figures 3, 5:
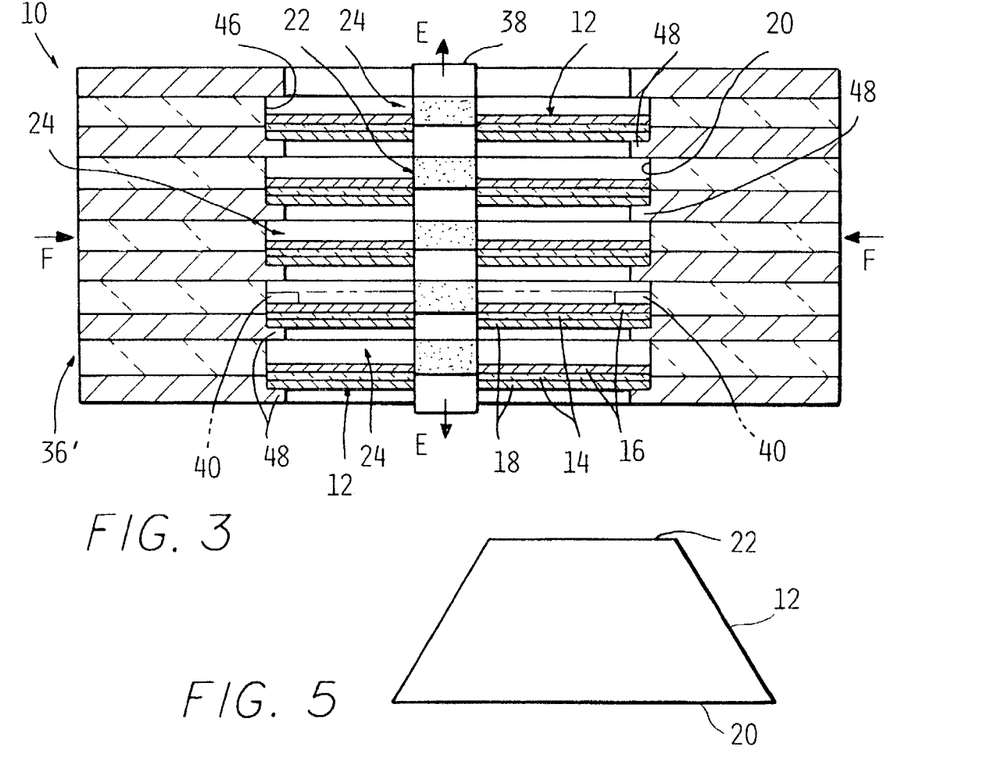
FIG. 3 is a cross-sectional front view of an alternate embodiment of the present invention.
FIG. 5 is a block diagram of a further embodiment of the present invention.

As may be seen in the embodiment of fuel cell system 10 as shown in FIG. 3, manifold 36' is operatively and fluidly connected to the inlet 20 of each of the flow passages 24, for adding the gas stream to flow passages 24. Manifold 36' defines a housing containing fuel cell system 10. As in previously described embodiments, the gas flows radially inward from an outer circumference of at least one of the plurality of fuel cell assemblies 12 toward the exhaust conduit 38. The exhaust gases exit exhaust conduit 38 axially. The manifold 36' defining the housing for fuel cell system 10 may be formed of any suitable material, and of any suitable shape as desired.

It is to be understood that manifold 36, 36' may be formed from any suitable material as desired and/or necessitated by a particular end use. In embodiments of the present invention, manifold 36, 36' walls are porous in the x and y direction, but form a gas barrier in the z direction. In an embodiment, manifold 36, 36' is formed from a material that is at least one of porous, non-porous and partially porous. (In FIG. 3, porous sections of manifold 36' are shown in dashed line.) Some suitable examples of such a material include, but are not limited to at least one of alumina, anodic alumina, zirconia, yttria-stabilized zirconia, samarium doped-ceria, gadolinium doped-ceria, $La_aSr_bGa_cMg_dO_{-\delta}$, and mixtures thereof.

Housing 36' has an inner wall 46 with a plurality of shelf members 48 extending radially inward, wherein adjacent shelf members 48 are spaced from each other. At least some of the plurality of shelf members 48 support and space apart adjacent fuel cell assemblies 12, thereby forming at least some of the plurality of flow passages 24 therebetween. In the embodiment shown in FIG. 3, interconnect/current collector members 40 (one is shown in phantom, but it is to be understood that there may be any number of members 40 as desired and/or as necessary) may be placed in any suitable location as desired and/or necessitated by a particular end use. As non-limitative examples, current collector members 40 may be adjacent conduit 38 (as shown in FIG. 2), or the current collector members 40 may be disposed adjacent the inlet 20/outer periphery (as shown in FIG. 3) of fuel cell system 10, and/or in like suitable areas. Without being bound to any theory, it is believed that properly configured interconnect/current collector members 40 aid in gas flow. It is to be understood that the interconnect/current collector members may be porous, partially porous, and/or slotted.

In the embodiment of the present invention shown in FIG. 3, the fuel cell system 10 includes a single chamber fuel cell.

It is to be understood that fuel cell assembly 12 may be of any suitable size and shape, provided that a differential D exists between a given area A of inlet 20 and a given area B of outlet 22. Other parameters that may be taken into consideration include, but are not limited to pressure, gas flow, temperature, and the like.

An example of an alternate suitable shape of fuel cell assembly 12 is shown in FIG. 4, wherein the assembly 12 is substantially wedge shaped. A further example is shown in FIG. 5, wherein the fuel cell assembly 12 is substantially trapezoid shaped.

Referring now to FIG. 6, in an alternate embodiment of fuel cell system 10, exhaust conduit 38 includes therein a conduit 50 for oxidants. As such, fuel would yet be entering the inlets 20 and traveling radially inward toward the outlets 22; however, oxidants would be entering conduit 50 axially, then entering the flow passage 24 at the outlet 22, and moving radially outwardly toward the inlet 20. Oxidant conduit 50 may be of any suitable size, shape and material, as desired and/or necessitated by a particular end use. Further, conduit 50 may be disposed within and/or concentric in exhaust conduit 38. Still further, conduit 50 may be outside of exhaust conduit 38, for example, adjacent to, or near exhaust conduit 38.

A manifold 52 (shown schematically in FIG. 6) is operatively and fluidly connected to the flow passage 24 for adding the oxidants to the flow passage 24. In the non-limitative embodiment shown in FIG. 6, manifold 52 comprises a plurality of conduits extending from oxidant conduit 50 through exhaust conduit 38 and in fluid communication with outlet 22. It is to be understood that manifold 52 may be of any suitable configuration, depending upon the orientation of oxidant conduit 50 with respect to exhaust conduit 38, and as desired and/or necessitated by a particular end use.

A method of making a fuel cell system 10 according to an embodiment of the present invention includes operatively connecting a plurality of fuel cell assemblies 12 to exhaust conduit 38.

It is to be understood that the present invention is not intended to be limited to fuel cells. For example, embodiments of the present invention may be used as a method of enhancing catalytic activity of any suitable device.

It is to be understood that any suitable materials may be used for each of the anode 16, cathode 18 and electrolyte 14 of the fuel cell assembly 12 of embodiments of the present invention.

Embodiments of the present invention provide many advantages, examples of which include, but are not limited to the following. Embodiments of the present invention may advantageously result in improved thermal management. Fuel flow in known fuel cells wherein fuel flows from the inside toward the outside may generally use much of the fuel by the time it reaches about the midpoint between the center and the outer edges, thereby potentially wasting much of the catalytic surface adjacent the outer edges. It is believed that, generally as a result of the built in catalytic combustor 34, embodiments of the fuel cell system 10 of the present invention may advantageously result in higher system power per unit volume. Further, more rapid startup of embodiments of the fuel cell system 10 of the present invention may advantageously be possible, generally due to intimate fuel cell—combustor 34 contact. Further, embodiments of the present invention may result in superior combustion of fuel as compared to fuel cells having radially outward fuel flow.

While several embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A fuel cell, comprising:
   a substantially uninterrupted flow passage having an inlet and an outlet for a gas stream, the flow passage configured to direct the gas stream radially inward from the inlet toward the outlet, the gas stream at the inlet having a predetermined pressure higher than atmospheric pressure, the inlet having a first area, the outlet having a second area smaller than the first area; and
   at least one electrode having a catalytically active surface and disposed in the flow passage, wherein the active surface has an inlet end region and an outlet end region;
   wherein the differential between the first area and the second area results in the gas stream increasing velocity as it moves over the inlet end region to the outlet end region, thereby substantially maintaining catalysis on the active surface.

2. The fuel cell as defined in claim 1 wherein pressure at the outlet end region is substantially at or higher than atmospheric pressure.

3. The fuel cell as defined in claim 1 wherein heat generated by the fuel cell is substantially concentrated adjacent the outlet.

4. The fuel cell as defined in claim 1, further comprising a compressor, operatively and fluidly connected to the flow passage inlet, for supplying the gas stream at the predetermined pressure.

5. The fuel cell as defined in claim 1, further comprising a catalytic combustor, operatively and fluidly connected to the outlet, for oxidizing reaction products of catalysis.

6. The fuel cell as defined in claim 1 wherein the gas stream is at least one of reactants, oxidants, and mixtures thereof.

7. The fuel cell as defined in claim 6, further comprising a manifold operatively and fluidly connected to the inlet for adding the gas stream to the flow passage.

8. The fuel cell as defined in claim 7 wherein the manifold defines a housing containing the fuel cell.

9. The fuel cell as defined in claim 1, further comprising at least one fuel cell assembly, including:
   an electrolyte; and
   a counter-electrode disposed on one side of the electrolyte, wherein the at least one electrode is disposed on one of the one side and an opposed side of the electrolyte.

10. The fuel cell as defined in claim 9 wherein the at least one electrode is one of an anode or a cathode and wherein the counter-electrode is the other of a cathode or an anode.

11. The fuel cell as defined in claim 1, further comprising an exhaust conduit in fluid communication with the outlet.

12. The fuel cell as defined in claim 11 wherein the gas stream comprises reactants and wherein the exhaust conduit comprises:
   a conduit for oxidants; and
   a manifold operatively and fluidly connected to the flow passage for adding the oxidants to the flow passage.

13. The fuel cell as defined in claim 10, further comprising an electrical interconnect member between the fuel cell and at least one of an electrical load and an electrical storage device.

14. The fuel cell as defined in claim 13 wherein the at least one fuel cell assembly is substantially wedge shaped.

15. The fuel cell as defined in claim 13 wherein the at least one fuel cell assembly is substantially trapezoid shaped.

16. The fuel cell as defined in claim 13, further comprising a plurality of the fuel cell assemblies and a plurality of the interconnect members, at least one of the plurality of interconnect members associated with each of the plurality of fuel cell assemblies.

17. The fuel cell as defined in claim 16, further comprising a plurality of the flow passages, wherein at least some of the plurality of interconnect members space adjacent fuel cell assemblies from each other, thereby forming one of the plurality of single flow passages therebetween.

18. The fuel cell as defined in claim 17 wherein each of the plurality of fuel cell assemblies is substantially cylindrically shaped with a hollow center region, and wherein the fuel cell further comprises an exhaust conduit operatively disposed in the plurality of hollow center regions and in fluid communication with the outlet of each of the plurality of flow passages.

19. The fuel cell as defined in claim 18 wherein each of the plurality of interconnect members is substantially ring shaped and is at least one of porous, partially porous, and slotted.

20. The fuel cell as defined in claim 18 wherein the gas flows radially inward from an outer circumference of at least one of the plurality of fuel cell assemblies toward the exhaust conduit.

21. The fuel cell as defined in claim 18 wherein the exhaust conduit is at least one of porous and partially porous.

22. The fuel cell as defined in claim 18 wherein each of the plurality of hollow center regions is substantially circular and wherein the exhaust conduit is substantially cylindrical.

23. A fuel cell, comprising:
   a plurality of flow passages, each having an inlet and an outlet for a gas stream, the gas stream at the inlet having a predetermined pressure higher than atmospheric pressure, the inlet having a first area, the outlet having a second area smaller than the first area;
   a plurality of fuel cell assemblies, each of the fuel cell assemblies including:
     an electrolyte;
     a counter-electrode disposed on one side of the electrolyte; and
     at least one electrode disposed on the one side or an opposed side of the electrolyte, the at least one electrode having a catalytically active surface and disposed in one of the plurality of flow passages, wherein the active surface has an inlet end region and an outlet end region; and
   a plurality of electrical interconnect members, at least one of the plurality of electric interconnect members between the fuel cell and at least one of an electrical load or an electrical storage device, and at least one of the plurality of interconnect members associated with each of the plurality of fuel cell assemblies;
   wherein at least some of the plurality of interconnect members space adjacent fuel cell assemblies from each other, thereby forming one of the plurality of flow passages therebetween;
   wherein the at least one electrode is selected from an anode and a cathode and wherein the counter-electrode is selected from the other of a cathode and an anode;
   wherein anodes from adjacent fuel cell assemblies face each other, and wherein cathodes from adjacent fuel cell assemblies face each other; and wherein the differential between the first area and the second area results in the gas stream increasing velocity as it moves over the inlet end region to the outlet end region, thereby substantially maintaining catalysis on the active surface.

24. The fuel cell as defined in claim 17 wherein the anode from each of the plurality of fuel cell assemblies faces the cathode of an adjacent fuel cell assembly.

25. The fuel cell as defined in claim 16, further comprising:
a plurality of the flow passages; and
a manifold operatively and fluidly connected to the inlet of each of the flow passages for adding the gas stream to the flow passages.

26. The fuel cell as defined in claim 25 wherein each of the plurality of fuel cell assemblies is substantially cylindrically shaped with a hollow center region, and wherein the fuel cell further comprises an exhaust conduit operatively disposed in the plurality of hollow center regions and in fluid communication with the outlet of each of the plurality of flow passages.

27. The fuel cell as defined in claim 26 wherein the manifold defines a housing containing the fuel cell, and wherein the gas flows radially inward from an outer circumference of at least one of the plurality of fuel cell assemblies toward the exhaust conduit.

28. The fuel cell as defined in claim 26 wherein the exhaust conduit is at least one of porous and partially porous.

29. The fuel cell as defined in claim 26 wherein each of the plurality of hollow center regions is circular and wherein the exhaust conduit is cylindrical.

30. The fuel cell as defined in claim 27 wherein the housing is at least one of porous and non-porous.

31. The fuel cell as defined in claim 30 wherein the housing has an inner wall with a plurality of shelf members extending radially inward, wherein adjacent shelf members are spaced from each other, and wherein at least some of the plurality of shelf members support and space apart adjacent fuel cell assemblies, thereby forming at least some of the plurality of flow passages therebetween.

32. An electronic device, comprising:
a load; and
the fuel cell of claim 1 connected to the load.

33. A fuel cell, comprising:
a substantially uninterrupted flow passage having an inlet and an outlet for a gas stream, the flow passage configured to direct the gas stream radially inward from the inlet toward the outlet, the gas stream at the inlet having a predetermined pressure higher than atmospheric pressure, the inlet having a first area, the outlet having a second area smaller than the first area; and
at least one electrode having a catalytically active surface and disposed in the flow passage, wherein the active surface has an inlet end region and an outlet end region, wherein pressure at the outlet end region is substantially near or higher than atmospheric pressure;
wherein the differential between the first area and the second area results in the gas stream increasing velocity as it moves over the inlet end region to the outlet end region, thereby substantially maintaining catalysis on the active surface; and
wherein heat generated by the fuel cell is substantially concentrated adjacent the outlet.

34. The fuel cell as defined in claim 33, further comprising a catalytic combustor, operatively and fluidly connected to the outlet, for oxidizing reaction products of catalysis.

35. The fuel cell as defined in claim 34, further comprising a compressor, operatively and fluidly connected to the flow passage inlet, for supplying the gas stream at the predetermined pressure.

36. The fuel cell as defined in claim 34, further comprising at least one fuel cell assembly, including:
an electrolyte; and
a counter-electrode disposed on one side of the electrolyte, wherein the at least one electrode is disposed on one of the one side and an opposed side of the electrolyte;
wherein the at least one electrode is one of an anode and a cathode and wherein the counter-electrode is the other of a cathode and an anode.

37. The fuel cell as defined in claim 36, further comprising an electrical interconnect member between the fuel cell and at least one of an electrical load and an electrical storage device.

38. The fuel cell as defined in claim 37, further comprising:
a plurality of the fuel cell assemblies and a plurality of the interconnect members, at least one of the plurality of interconnect members associated with each of the plurality of fuel cell assemblies; and
a plurality of the flow passages, wherein at least some of the plurality of interconnect members space adjacent fuel cell assemblies from each other, thereby forming one of the plurality of flow passages therebetween.

39. The fuel cell as defined in claim 38 wherein each of the plurality of fuel cell assemblies is substantially cylindrically shaped with a hollow center region, and wherein the fuel cell further comprises an exhaust conduit operatively disposed in the plurality of hollow center regions and in fluid communication with the outlet of each of the plurality of flow passages, wherein the catalytic combustor is operatively disposed within the exhaust conduit.

40. A fuel cell, comprising:
a substantially uninterrupted flow passage having an inlet and an outlet for a gas stream, the flow passage configured to direct the gas stream radially inward from the inlet toward the outlet, the inlet having a first area, the outlet having a second area smaller than the first area;
at least one electrode having a catalytically active surface and disposed in the flow passage, wherein the active surface has an inlet end region and an outlet end region; and
a catalytic combustor, operatively and fluidly connected to the outlet, for oxidizing reaction products of catalysis;
wherein the differential between the first area and the second area results in the gas stream increasing velocity as it moves over the inlet end region to the outlet end region, thereby substantially maintaining catalysis on the active surface.

41. A fuel cell, comprising:
at least one electrode operatively disposed in a substantially uninterrupted gas flow passage of the fuel cell, and having a catalytically active surface, the flow passage configured to direct the gas flow radially inward from a flow passage inlet toward a flow passage outlet; and
means for substantially maintaining catalysis over the active surface of the at least one electrode.

42. The fuel cell as defined in claim 41 wherein the at least one electrode is at least one of an anode or a cathode.

43. A method of making a fuel cell, comprising the step of:
- operatively connecting a plurality of fuel cell assemblies to an exhaust conduit, each of the plurality of fuel cell assemblies spaced from an adjacent fuel cell assembly and having a substantially uninterrupted flow passage therebetween, the flow passage having an inlet and an outlet for a gas stream, the flow passage configured to direct the gas stream radially inward from the inlet toward the outlet, the gas stream at the inlet having a predetermined pressure higher than atmospheric pressure, the inlet having a first area, the outlet in fluid communication with the exhaust conduit and having a second area smaller than the first area, wherein each of the plurality of fuel cell assemblies comprises an anode disposed on one side of an electrolyte, and a cathode disposed on one of the one side and an opposed side of the electrolyte, wherein each of the anode and the cathode has a catalytically active surface disposed in the flow passage, wherein the active surface has an inlet end region and an outlet end region, and wherein the differential between the first area and the second area results in the gas stream increasing velocity as it moves over the inlet end region to the outlet end region, thereby substantially maintaining catalysis on the active surface.

44. A method of using a fuel cell, comprising the step of:
operatively connecting the fuel cell to at least one of an electrical load and an electrical storage device, the fuel cell including:
- a substantially uninterrupted flow passage having an inlet and an outlet for a gas stream, the flow passage configured to direct the gas stream radially inward from the inlet toward the outlet, the gas stream at the inlet having a predetermined pressure higher than atmospheric pressure, the inlet having a first area, the object having a second area smaller than the first area; and
- at least one electrode having a catalytically active surface and disposed in the flow passage, wherein the active surface has an inlet end region and an outlet end region;
- wherein the differential between the first area and the second area results in the gas stream increasing velocity as it moves over the inlet end region to the outlet end region, thereby substantially maintaining catalysis on the active surface.

45. The method as defined in claim 44 wherein pressure at the outlet end region is substantially at or higher than atmospheric pressure, and wherein heat generated by the fuel cell is substantially concentrated adjacent the outlet.

46. The method as defined in claim 45 wherein the fuel cell further comprises a catalytic combustor, operatively and fluidly connected to the outlet, for oxidizing reaction products of catalysis.

47. The method as defined in claim 46, further comprising the step of preheating the fuel cell by directing a fuel flow into the catalytic combustor at start-up until the fuel cell has reached a predetermined temperature.

48. A method of enhancing catalytic activity, comprising the step of:
- positioning within a substantially uninterrupted flow passage at least one electrode having a catalytically active surface, wherein the active surface has an inlet end region and an outlet end region, wherein the flow passage has an inlet and an outlet for a gas stream, the flow passage configured to direct the gas stream radially inward from the inlet toward the outlet, the gas stream at the inlet having a predetermined pressure higher than atmospheric pressure, the inlet having a first area, the outlet having a second area smaller than the first area, wherein the differential between the first area and the second area results in the gas stream increasing velocity as it moves over the inlet end region to the outlet end region, thereby substantially maintaining catalysis on the active surface.

49. A fuel cell, comprising:
- a flow passage having an inlet and an outlet for a gas stream, the gas stream at the inlet having a predetermined pressure higher than atmospheric pressure, the inlet having a first area, the outlet having a second area smaller than the first area; and
- at least one electrode having a catalytically active surface and disposed in the flow passage, wherein the active surface has an inlet end region and an outlet end region;
- wherein the differential between the first area and the second area results in the gas stream increasing velocity as it moves over the inlet end region to the outlet end region, thereby substantially maintaining catalysis on the active surface;
- and wherein the fuel cell is a single chamber fuel cell.

50. A fuel cell, comprising:
- a flow passage having an inlet and an outlet for a gas stream, the gas stream at the inlet having a predetermined pressure higher than atmospheric pressure, the inlet having a first area, the outlet having a second area smaller than the first area, wherein the gas stream is at least one of reactants, oxidants, and mixtures thereof;
- at least one electrode having a catalytically active surface and disposed in the flow passage, wherein the active surface has an inlet end region and an outlet end region; and
- a manifold operatively and fluidly connected to the inlet for adding the gas stream to the flow passage, wherein the manifold includes walls that are porous in the x and y direction, while forming a gas barrier in the z direction;
- wherein the differential between the first area and the second area results in the gas stream increasing velocity as it moves over the inlet end region to the outlet end region, thereby substantially maintaining catalysis on the active surface.

* * * * *

UNITED STATES PATENT AND TRADEMARK OFFICE
CERTIFICATE OF CORRECTION

PATENT NO. : 7,147,948 B2 Page 1 of 1
APPLICATION NO. : 10/428297
DATED : December 12, 2006
INVENTOR(S) : David Champion et al.

It is certified that error appears in the above-identified patent and that said Letters Patent is hereby corrected as shown below:

On the Title Page, Item (73), in "Assignee", in column 1, line 2, delete "LP.," and insert -- L.P., --, therefor.

In column 5, line 44, delete "$La_aSr_bGa_cMg_dO_{-\delta}$," and insert -- $La_aSr_bGa_cMg_dO_{3-\delta}$, --, therefor.

In column 8, line 12, in Claim 17, after "plurality of" delete "single".

In column 9, line 56, in Claim 33, delete "cutlet" and insert -- outlet --, therefor.

In column 11, line 37, in Claim 44, delete "object" and insert -- outlet --, therefor.

Signed and Sealed this

Twenty-ninth Day of September, 2009

David J. Kappos
*Director of the United States Patent and Trademark Office*